United States Patent [19]

Taillet et al.

[11] 4,394,998
[45] Jul. 26, 1983

[54] PROCESS AND APPARATUS FOR EXPLORING THE ATMOSPHERE OF A PLANET

[75] Inventors: Joseph Taillet, Boulogne; Jean Maulard, Clamart, both of France

[73] Assignee: Office National d'Etudes et de Recherche Aerospatiales (ONERA), Chatillon Sous Bagneux, France

[21] Appl. No.: 264,852

[22] Filed: May 18, 1981

[51] Int. Cl.³ ............................................... B64B 1/62
[52] U.S. Cl. .................................. 244/31; 73/170 R; 244/97; 244/158 R
[58] Field of Search ....................... 244/31, 96, 97, 98, 244/158 R; 73/170 R

[56] References Cited

U.S. PATENT DOCUMENTS

| 1,035,560 | 8/1912 | Erdmann | 244/98 |
| 3,107,068 | 10/1963 | Simko et al. | 244/158 |
| 3,268,184 | 8/1966 | Biggar et al. | 244/158 |
| 3,282,533 | 11/1966 | Spain | 244/158 |
| 4,172,048 | 10/1979 | Dunlap | 244/98 |
| 4,215,834 | 8/1980 | Dunlap | 244/97 |

Primary Examiner—Charles E. Frankfort
Attorney, Agent, or Firm—Larson and Taylor

[57] ABSTRACT

For exploring the high density high temperature atmosphere of a planet at a stabilized altitude, a buoyant assembly comprising an inflatable envelope is used. A container connectable with the envelope and containing a liquid selected to vaporize in the planet atmosphere to an extent which decreases above the stabilized altitude and increases under the stabilized altitude, is launched into the planet atmosphere with the envelope in folded condition.

8 Claims, 8 Drawing Figures

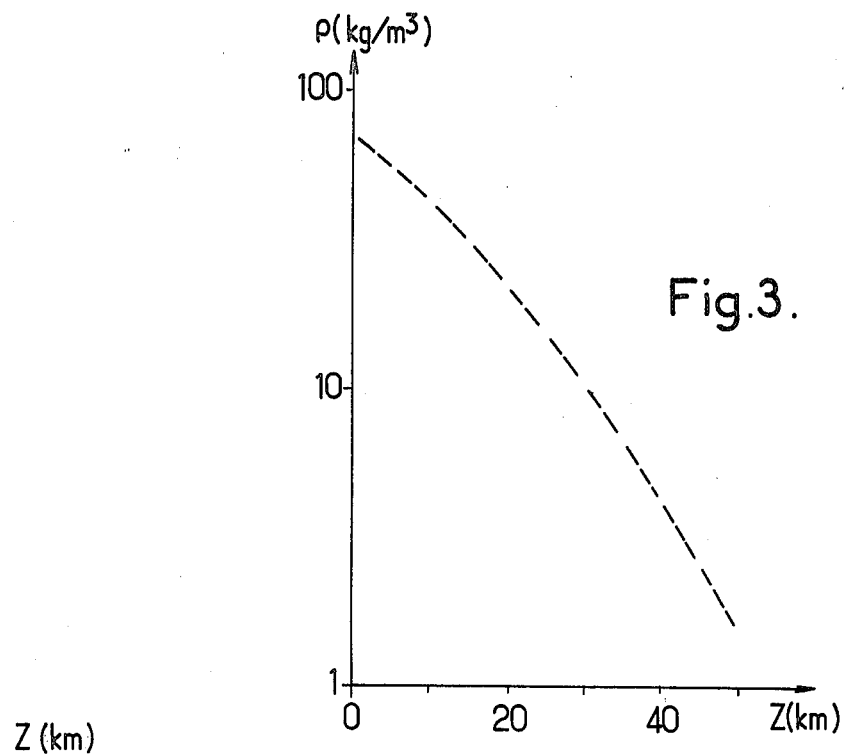
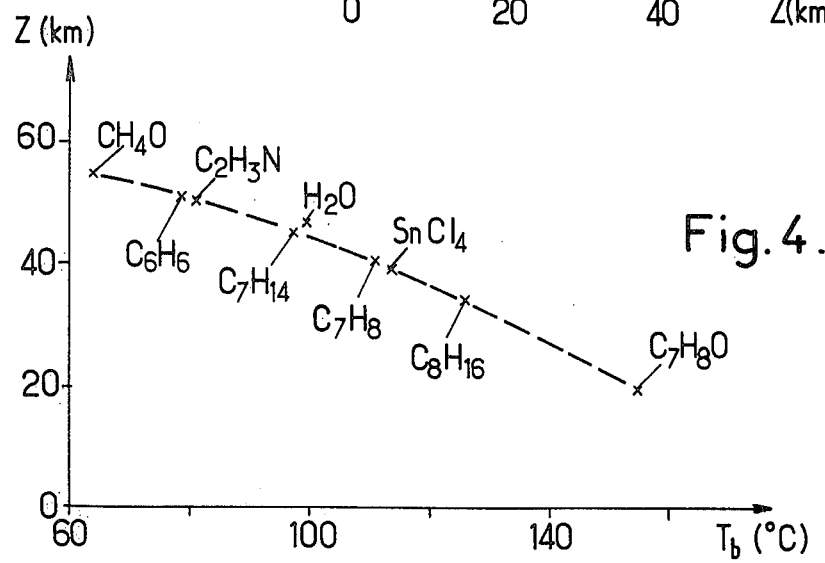
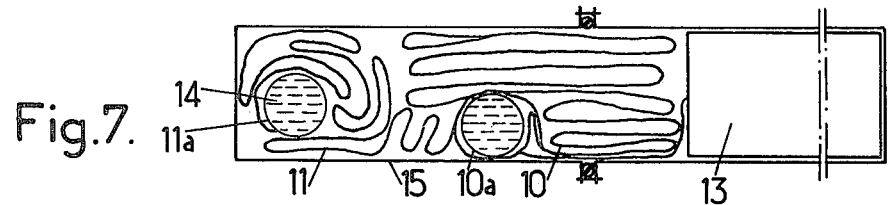

PROCESS AND APPARATUS FOR EXPLORING THE ATMOSPHERE OF A PLANET

BACKGROUND AND SUMMARY OF THE INVENTION

The invention relates to exploration of planets of the solar system other than Earth, particularly those planets whose atmosphere has a high density and a high temperature. The invention is of particular interest for exploration of the Venusian atmosphere which essentially consists of carbon dioxide whose temperaure and density variations with altitude have a profile which is particularly suitable for carrying out the process of the invention.

For that purpose, the process of the invention makes use of a buoyant assembly comprising an inflatable envelope which may be launched from Earth in folded condition and inflated with a vaporizable fluid when dropped in the Venusian atmosphere. Such assemblies consisting of an envelope and a container connectable with the envelope and containing a vaporizable liquid have already been suggested for inflation at high altitudes above sea level. Referring for instance to U.S. Pat. No. 3,107,068 to SIMKO et al, there is disclosed an inflatable closed envelope which is inflated by a liquid vaporizable at altitudes in excess of 150,000 feet upon opening of an enclosure which receives the envelope and container for launch. Similarly, U.S. Pat. No. 3,282,533 to SPAIN discloses a foldable expandable structure which may be inflated by vapor evolved from water or ice stored for launching and which vaporizes upon exposure to vacuum conditions which prevail at high altitudes. The purpose and function of such inflatable structures are entirely different from those of the present invention.

It has also been suggested to use a buoyant station balloon for exploring the Venus atmosphere (Journal of Spacecraft, Vol. 7, No. 7, July 1970, pp. 859-864). The balloon can carry a pay-load such as scientific apparatuses, radio-electric transmission apparatuses, radar reflectors, and the like. However, none of the proposed Venus stations is adapted for remaining at a self-stabilized predetermined altitude with vertical oscillations which remain within a limited range. Similarly, the inflatable enclosures which have been proposed for use in exploring the Earth atmosphere would not be adapted to such a stabilization, irrespective of the fact whether they are of the "open" type (which requires the use of a ballast and active means for controlling altitude and dropping amounts of ballast when required) or of the "closed" type.

It is an object of the invention to provide a process for exploring the high density high temperature atmosphere of a planet by means of a buoyant assembly which achieves automatic altitude stabilization without any requirement for active means. It is another object to provide such a buoyant assembly whose bulk and weight are suitable for launching from the Earth and which achieves altitude stabilization with a sufficient precision.

A process according to the invention comprises carrying a buoyant assembly from the Earth into the atmosphere of the planet to be explored. The assembly comprises an inflatable envelope which may be launched from the Earth in folded condition and a container connectable with said envelope and containing a vaporizable liquid. That liquid is selected to vaporize under the conditions prevailing in the atmosphere of said planet to an extent which decreases above said altitude and increases under said altitude for stabilization. The container may be separate from the envelope and connectable thereto by means which are actuated upon opening of an enclosure containing the envelope and container in the atmosphere of the planet. It may also consist of a thin wall container which is fractured by the vapor evolved from the liquid when subjected to the temperature and pressure which prevail in the atmosphere of the planet, particularly under the stabilization altitude.

The assembly may comprise one or more inflatable envelopes; in the latter case, the fluid in one envelope may be selected to provide an upwardly directed force at high altitudes, that is to have a positive buoyancy at all altitudes, while the other envelope receives a fluid selected to have a positive or negative buoyancy depending upon the altitude, for stabilization purpose.

Particular embodiments of the invention will now be described by way of examples, with particular reference to stations for exploration of the atmosphere of Venus.

SHORT DESCRIPTION OF THE DRAWINGS

FIG. 3 is a diagram representing the variations of the density of the atmosphere of Venus as a function of altitude Z.

FIG. 4 is a representation of the boiling temperature $T_{eb}$ of several fluids plotted against altitude Z;

FIG. 7 is a simplified representation of the assembly in folded condition in a container used for launch.

DETAILED DESCRIPTION OF PREFERRED EMBODIMENTS

Figure 1:
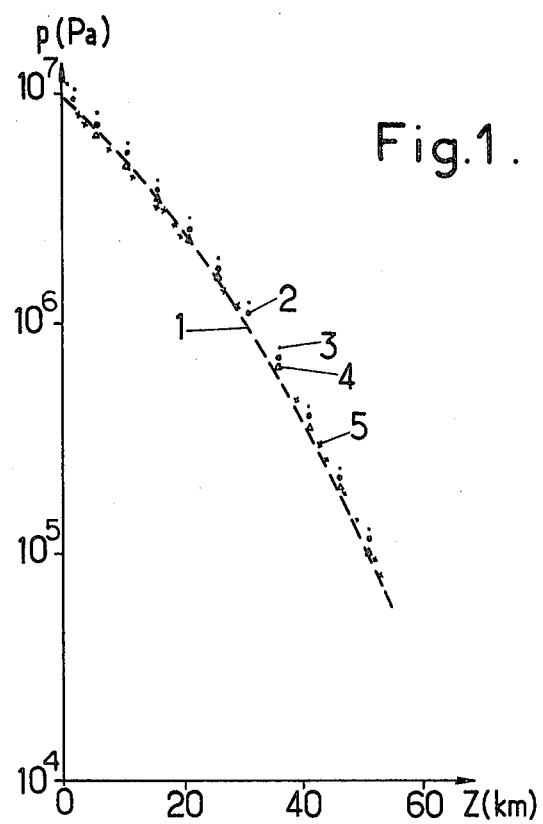
FIG. 1 is a representation of the variation of the atmospheric pressure in the Venus atmosphere with altitude.

Referring to FIG. 1, reference 1 is a representation of the values published by NASA in 1972, while references 2, 3 and 4 respectively designate the mean, maximum and minimum values given by MOROZ in 1973. A satisfactory representation of the variation of pressure p vs altitude Z is given by:

$$p = 10^7 \exp(-5.3 \times 10^{-2} Z + 7.3 \times 10^{-4} Z^2) \quad (1)$$

In formula (1), Z is altitude, from $Z=0$ which corresponds to a distance of 6050 km from the center of Venus and p is in Pa.

Figure 2:
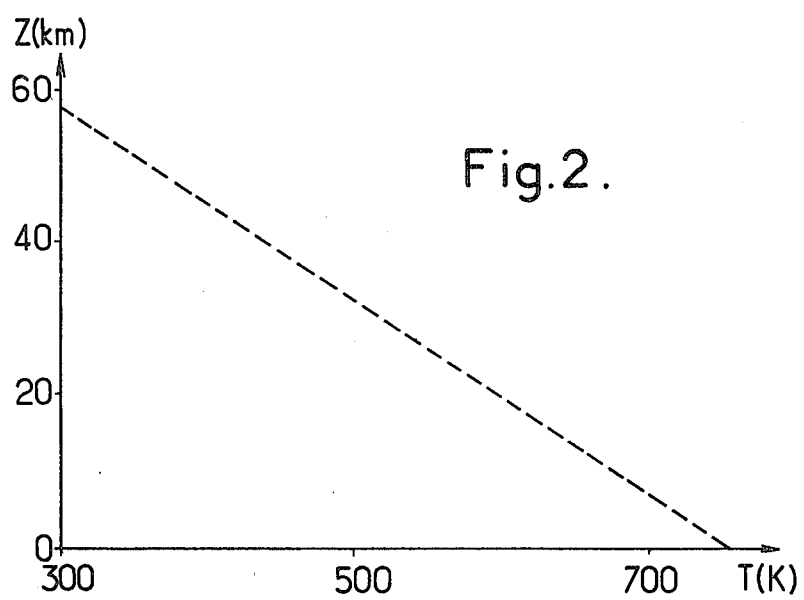
FIG. 2 is a representation of the variation of the temperature as a function of altitude.

Referring to FIG. 2, the variations of temperature T (K) with altitude Z may be represented by:

$$T = 760 - 8Z \quad (2)$$

Referring to FIG. 3, the density $\rho(kg/m^3)$ of the atmosphere of Venus may be computed from pressure p and temperature T (FIGS. 1 and 2) by using the Van der Waals equation:

$$\left[\frac{p}{p_c} + 3\left(\frac{\rho}{\rho_c}\right)^2\right]\left[3\frac{\rho_c}{\rho} - 1\right] = 8\,T/T_c \quad (3)$$

in which:
$p_c = 74.10^5$ Pa (the index c being for "critical")
$T_c = 304$ K
$\rho_c = (8/3)(p_c M_{co2}/R\, T_c)$
$M_{co2} = 44.10^{-3}$ kg It will now be assumed, by way of example, that assemblies consisting of a balloon and a payload carrying a passive radar or optical receptor and/or a R.F. transmitter with its power supply are to be located in the atmosphere of Venus. The nature of the fluid to be used and the volume of the envelope of the balloon will be selected depending on the reqired stabilization temperature and the weight of the payload, which will be assumed to be approximately 2 kg. The boiling points of several fluids which may be used are illustrated in FIG. 4 and selection will be made depending on the required stabilization altitude. The following may be considered as of particular interest for decreasing altitude:

methanol: $CH_4O$
benzene: $C_6H_6$
methyl cyanide: $C_2H_3N$
2-heptene(trans): $C_7H_{14}$
water
Tin tetrachloride: $Sn\,Cl_4$
toluene: $C_7H_8$
2-octene(cis): $C_8H_{16}$
anisol: $C_7H_8O$ It is clear from a consideration of FIG. 4 that water, methyl cyanide, benzene and methanol, whose molecular masses are lower than that of $CO_2$, may be used for altitudes varying from 47 km to 55 km, for sustentation and stabilization.

In a preferred embodiment, the assembly comprises two balloons connected to a same nacelle. The gas tight envelope of a first balloon, which constitutes the carrying or sustentation balloon, contains a fluid which is in vapor phase under the temperature and pressure conditions which prevail at the required stabilization atmosphere.

The air tight envelope of the second balloon, which constitutes the stabilization balloon, contains another fluid whose phase change around the required altitude of the assembly results in stabilization.

For altitudes lower than those referred to above, the fluid in the carrying balloon may be water while the stabilization balloon may contain toluene, 2-octene(cis) and anisol for altitudes of 40 km, 35 km and 20 kg respectively.

Figure 5A:
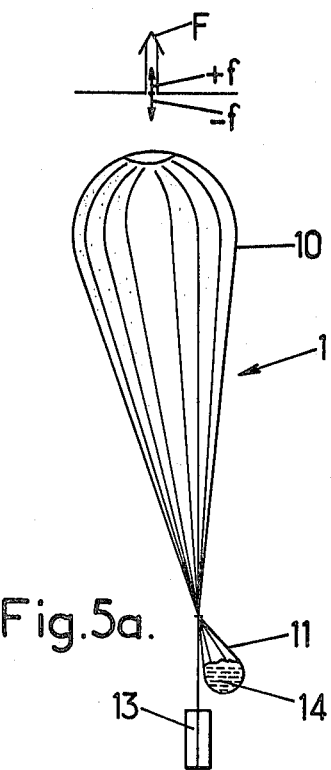
FIGS. 5a and 5b are schematic illustrations of two embodiments of the invention.

Referring to FIG. 5a, there is shown an assembly 1 having two ballons, namely a carrying balloon 10 and a stabilizing balloon 11 bound together and to a nacelle 13. The embodiment of FIG. 5b differs from that of FIG. 5a in that balloon 11 is within the envelope of balloon 10.

The gas tight envelopes of balloons 10 and 11 are typically of polyimide material, particularly "KAPTON".

Figure 5B:
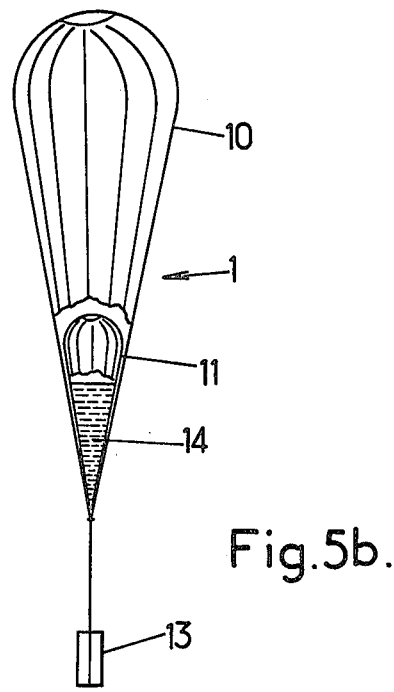

Both FIGS. 5a and 5b illustrate the balloons in a condition they assume in the atmosphere of Venus as the assembly is about to stabilize at the selected altitude. The envelope of carrying balloon 10 contains water vapor which gives rise to an upwardly directed force F, while the envelope of stabilizing balloon 11 contains a liquid 14 whose liquid-vapor or vapor-liquid phase change, responsive to outside pressure and temperature variations, results in an additional force of variable value and direction (upward force $+f$ or downward force $-f$).

The movement of the assembly in the vertical direction may be repesented by an equation indicating balance between the inertia force, the ascending force and the aerodynamic braking force exerted by the outside atmosphere. If U is the instantaneous speed, $\Sigma$ the greatest cross-sectional area and $C_x$ the drag coefficient, the equation is:

$$m_t\,du/dt - g\,[\rho_{co2}(V + V') - m_t] + \frac{C_x}{2}\rho_{co2}\,U\,|U|\,\Sigma = 0 \quad (4)$$

In equation (4), $m_t$ is the overall mass of the assembly, V and V' are the volumes of the balloons which are substantially equal to the volumes of the internal fluids and $\Sigma$ may be considered as equal to the maximum area of the greater balloon (sustentation balloon 10). $C_x$ is about 2, which is commonly accepted for a sphere. If necessary, a more precise value may be determined experimentally for any particular shape of the components of the system.

The particulars of the assembly may be optimized by solving equation (4), for instance for a minimum extent of vertical oscillation: it may be essential that the assembly does not reach too low an altitude, due to the limited heat resistance of the envelope, and too high an altitude, due to a risk of envelope burst.

Figure 6:
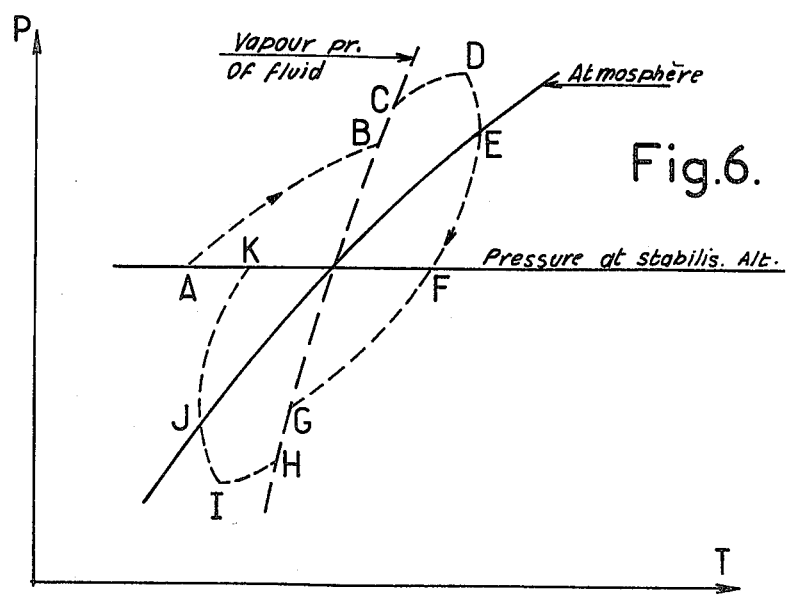
FIG. 6 is a diagram of the pressure plotted against the temperature, illustrating changes in the condition of the stabilizing fluid during stabilization.

The initial conditions to be used for solving equation (4) comprise the vertical speed at the first crossing of the stabilization altitude. Assuming that the assembly is dropped from an altitude higher than the stabilization altitude (for instance 50 km) where both fluids are in liquid phase, that assembly crosses the stabilization altitude with a falling speed. FIG. 6 is a representation of the variations in the condition of the stabilizing fluid contained in balloon 11 during the oscillations. On FIG. 6, the curves in full line and in broken line represent the variations of the atmospheric pressure versus temperature and the variations of the vapor pressure of the fluid versus the temperature, respectively.

It will be assumed that the fluid is initially in the condition represented by A: it is completely in liquid phase at the stabilization altitude. Its temperature is lower than that of the ambient atmosphere. The assembly is falling.

The line between A and B corresponds to continued downward movement of the assembly. The temperature of the liquid increases steadily until the boiling temperature is attained at B.

Along line B-C, there is evaporation at constant temperature, while the pressure increases. The amount of heat taken from the atmosphere is used for heating the fluid and for evaporating the fluid. At C, the fluid is entirely in vapor phase.

Line C-D represents a situation in which the assembly is subjected to an upwardly directed acceleration. The falling speed decreases while the temperature of the vapor again increases. At D, vertical speed is zero. Then the direction of the vertical speed changes. It may be noted at this point that point D may possibly be on the full line representing the condition of the atmosphere.

From D to E, the balloon gains altitude while the temperature still increases. From E to F (stabilization altitude), the balloon rises with an upwardly directed acceleration, which is however limited by the air drag. From F to G, the fluid is still entirely in vapor phase and the balloon still rises, but cools down. At G, the saturation pressure of the fluid is reached again. From G to H, there is progressive condensation of the fluid under a decreasing pressure. Condensation and cooling result in heat loss from the balloon. Along H-I, the upward movement progressively decreases, then becomes zero. From I to J, another descending movement initiates with a temperature decrease. Downward movement is maintained after J, but there is heating from the ambient atmosphere. At point K, the balloon is again at the stabilization altitude and initiates a new cycle, but with an amplitude of vertical movement which is lower.

For launch, the assembly may be located in a gas tight metal enclosure. Both envelopes 10 and 11 are located in folded condition in the container. The two fluids may preferably be received in first and second sealed containers 10a, 11a, for instance of "Kapton". Each container has a volume which is much lower than that of the associated envelope and is received therein. The bottom of each envelope is attached to the nacelle which contains the pay load.

The enclosure may then descend toward the planet to be explored. The space vehicle containing the enclosure is located on an orbit about the planet and the enclosure 15 is separated from the vehicle and braked, typically by retroacting ejectors. The enclosure then falls freely into the atmosphere. Assuming that the planet is Venus, means (not shown) are provided for automatically opening the enclosure at a predetermined altitude, for instance about 50 km. For that purpose, the enclosure may be in two parts connected by exploding bolts. Then the assembly comprising carrying and stabilization balloons 10, 11 falls within the atmosphere. During that downward movement, the liquids are heated; temperature increase causes the liquid to expand and to vaporize. The container 10a is designed for bursting first and then the fluid in liquid and vapor phase expands into the envelope which is initially in deflated condition. Due to substantially complete vaporization, the envelope becomes inflated and brakes the downward movement. It will be appreciated that the mass of fluid is selected in proportion to the maximum volume of the balloon for avoiding tensile stresses in the envelope. In other words, any increase in the volume taken by the fluid in vapor phase results in a change of shape of the balloon rather than an extension of the envelope wall.

The assembly retains its downward movement for a certain time, since the fluid of the stabilizing balloon is still in liquid condition. Then container 11a bursts and there is partial vaporization of the liquid which results in stabilization of the assembly at the altitude corresponding to the phase change curve of the stabilization fluid. The assembly then has vertical oscillations which are progressively dampened. The variation of the amplitude as a function of time may be approximately computed, from the thermal exchange properties and the drag effect of the atmosphere.

In the above, it was assumed that the enclosure carried a single assembly, for stabilization at one predetermined altitude. Due to the low size and bulk of each assembly, a single enclosure 15 may contain several assemblies having stabilizing fluid of different natures, for stabilizations at different altitudes.

While the above description was made with particular reference to exploration of Venus, it should be understood that the invention is suitable for use in exploring a planet atmosphere which is both of high density and relatively high temperature.

We claim:

1. A process for exploring the high density high temperature atmosphere of a planet other than Earth at a substantially predetermined altitude, comprising carrying from the Earth into said atmosphere a buoyant assembly comprising an inflatable closed envelope and a container connectable with said envelope and containing one compound stored in liquid form, selected to vaporize in said atmosphere to an extent which decreases above said altitude due to temperature decrease and which increases under said altitude, and having a molecular weight lower than the average molecular weight of said atmosphere.

2. A process according to claim 1, wherein the amount of stored liquid is selected in proportion to the value of the fully extended envelope for not subjecting the envelope to tensile forces when said liquid has completely vaporized in said atmosphere.

3. A process according to claim 1 or 2, wherein said liquid is of a type which does not vaporize under the conditions prevailing in the earth atmosphere.

4. A process according to claim 2, further comprising connecting an additional envelope to the first named inflatable envelope and communicating the additional envelope with an additional container containing an additional vaporizable liquid of a type different from the first liquid for stabilization at said predetermined altitude.

5. A process according to claim 1 for exploring the atmosphere of Venus, wherein the liquid compound in said container is selected from the group consisting of water, $C_2H_3N$, $C_6H_6$, and $CH_4O$ which each have a molecular mass lower than that of $CO_2$ which constitutes the major portion of the Venusian atmosphere.

6. A process according to claim 4 for exploring the atmosphere of Venus, wherein the liquid contained in said container is water, and the liquid contained in the additional container is selected from the group consisting of toluene $C_7H_8$, 2-octene (cis) $C_8H_{16}$ and anisol $C_7H_8O$.

7. A process according to claim 1 wherein said container comprises a material adapted to be fractured by the pressure of said compound when above a predetermined temperature lower than the temperature at said predetermined altitude, and wherein said method further comprises locating said container within said envelope, locating said envelope in packed condition in an air-tight enclosure, launching said enclosure toward said planet, and opening said enclosure in the atmosphere of said planet above said predetermined altitude.

8. An apparatus for exploring the atmosphere for Venus at a predetermined constant altitude, comprising:
a gas tight, rigid enclosure;
means for opening said enclosure in said atmosphere above said predetermined altitude;
and a buoyant assembly located in folded condition in said enclosure; said buoyant assembly comprising:
a first gas tight deformable inflatable envelope accomodating a first container containing water, said first container being constructed to fracture under the pressure forces developed by water vapour at a first altitude in said atmosphere, a second gas tight deformable inflatable envelope accomodating a second container containing a fluid selected from the group consisting of toluene, 2-octene(cis) and anisol, said second container being constructed to fracture under the pressure forces developed by said fluid at a second altitude lower than said first altitude, and a payload commensurate in weight with the buoyancy of said envelopes and connected to said envelopes.

* * * * *